United States Patent [19]

Carey et al.

[11] Patent Number: 5,526,465
[45] Date of Patent: Jun. 11, 1996

[54] METHODS AND APPARATUS FOR VERIFYING THE ORIGINATOR OF A SEQUENCE OF OPERATIONS

[75] Inventors: Michael J. Carey, Nr. Lydney; Eluned S. Parris, Tintern; John S. Bridle, Cheltenham, all of United Kingdom

[73] Assignee: Ensigma Limited, Gwent, United Kingdom

[21] Appl. No.: 39,054

[22] PCT Filed: Sep. 30, 1991

[86] PCT No.: PCT/GB91/01681

§ 371 Date: Apr. 5, 1993

§ 102(e) Date: Apr. 5, 1993

[87] PCT Pub. No.: WO92/06468

PCT Pub. Date: Apr. 16, 1992

[30] Foreign Application Priority Data

Oct. 3, 1990 [GB] United Kingdom ............... 9021489

[51] Int. Cl.⁶ ......................... G10L 5/06; G10L 9/00
[52] U.S. Cl. ................... 395/2.59; 395/2.52; 395/2.65
[58] Field of Search ................. 395/2.59, 2.65, 395/2.82, 2.64, 2.65, 2.55, 2.58, 2.52, 2.54; 382/10, 13, 14, 15, 2, 3; 381/41, 42, 43

[56] References Cited

U.S. PATENT DOCUMENTS

| 4,694,493 | 9/1987 | Sakoe ........................................ 381/42 |
| 4,783,804 | 11/1988 | Juang et al. ............................ 395/2.65 |
| 4,910,782 | 3/1990 | Watari ...................................... 381/42 |
| 5,033,087 | 7/1991 | Bahl et al. .............................. 381/43 |
| 5,293,452 | 3/1994 | Picone et al. ........................ 395/2.59 |
| 5,311,601 | 5/1994 | Carpenter et al. ..................... 382/15 |

FOREIGN PATENT DOCUMENTS

| 0099476 | 2/1984 | European Pat. Off. .......... G07C 9/00 |
| 0121248 | 10/1984 | European Pat. Off. .......... G10L 1/00 |

OTHER PUBLICATIONS

A Speaker Verification System Using Alpha Nets Carey et al. IEEE/May 1991.
Speaker Identification and Verification via Singular Value decomposition of speech parameters. Mahil et al IEEE/Aug. 1990.
Speaker Verification Over Long Distance Telephone Lines Naik et al. IEEE/May 1989.
Voice and Speech Processing Parsons McGraw–Hill, Inc. 1987.
N. Tishby, "Information Theoretic Factorization of Speaker and Language in Hidden Markov Models, etc.", *ICASSP 88/1988 International Conference on Acoustics, etc.*, Apr. 11–14, 1988, vol. 1, IEEE New York, pp. 87–90.

(List continued on next page.)

*Primary Examiner*—Allen R. MacDonald
*Assistant Examiner*—Richemond Dorvil
*Attorney, Agent, or Firm*—Young & Thompson

[57] ABSTRACT

Speaker verification is important in such applications as financial transactions which are to be carried out automatically by telephone. False acceptances of a speaker cause serious problems but so do frequent false rejections in view of the annoyance caused. Some of the problems of speaker verification are reduced in the invention by forming Hidden Markov Models (HMMs) for each of a number of words using features of utterances of these words from a large number of speakers. These models are known as world models. In addition, for every person whose speech is to be recognized, one HMM is formed for each of the words as uttered by that person. These models are known as personal models. In verification, a person is prompted to repeat a string of isolated or connected words (15) and features from each of these words are extracted (16). Next, the probabilities that these features could have been generated by the world models for these words and by the personal model of that person are calculated, respectively (17 and 18) and these probabilities are compared (19) for each word. A decision (23) on verification is based on a poll (22) of these comparisons.

40 Claims, 8 Drawing Sheets

OTHER PUBLICATIONS

J. M. Naik et al., "Speaker Verification Over Long Distance Telephone Lines", *ICASSP '89/1989 International Conference on Acoustics, etc.*, May 23–26, 1989, vol. 1, IEEE New York, pp. 524–526.

J. M. Naik, "Speaker Verification: A Tutorial", *IEEE Communications Magazine*, vol. 28, No. 1, Jan. 1990 (New York) pp. 42–48.

J. E. Luck, "Automatic Speaker Verification Using Cepstral Measurements", *The Journal of the Acoustical Society of America*, vol. 46, No. 4, part 2, 1969 (New York), pp. 1026–1032.

G. Velius, "Variants of Cepstrum Based Speaker Identity Verification", *ICASSP 88/1988 International Conference on Acoustics, etc.*, Apr. 11–14, 1988, vol. 1, IEEE, New York, pp. 583–586.

H. Gish, "Robust Discrimination in Automatic Speaker Identification", *ICASSP '90/1990 International Conference on Acoustics, etc.*, Apr. 3–6, 1990, Albuquerque US, vol. 1, IEEE New York, pp. 289–292.

F. K. Soong et al., "On the Use of Instantaneous and Transitional Spectral, etc.", *IEEE Transactions on Acoustics, etc.*, vol. 36, No. 6, Jun. 1988, New York, pp. 871–879.

METHODS AND APPARATUS FOR VERIFYING THE ORIGINATOR OF A SEQUENCE OF OPERATIONS

BACKGROUND OF THE INVENTION

1. Field of the Invention

The present invention relates to verifying that a sequence of operations has been carried out by a specific entity. Usually the entity is a person and the sequence of operations may, for example, be speaking a digit or a letter, or writing a letter or a word. Thus the invention relates particularly to the verification that an utterance was made by a predetermined person, but it is believed that the invention can be applied to other actions carried out by persons such as recognising written words.

2. Description of the Related Art

Speech recognition using Hidden Markov Models (HMM) is a well known technique and HMMs have also been applied to signature verification. Speaker verification is important in many applications, particularly where financial transactions are to be carried out automatically by telephone and where access to premises is to be controlled. False acceptances of speech are likely to cause serious problems when unauthorised transactions or access are allowed. Almost as important are false rejections where a person who should be verified is not. False rejections cause annoyance especially when they occur frequently.

Speech verification over telephone links raises its own problems due to the limited bandwidth of such links and distortion which often occurs.

Three previous examples of speaker verification systems are described in U.S. Pat. Nos. 4,363,102, 4,694,493 and 4,910,782.

According to a first aspect of the present invention there is provided a method of verifying that a sequence of operations originates from a specific entity, comprising the steps of extracting a test sequence of sets of features of the results of the operations, one set corresponding to each operation, matching the said test sequence of sets of features against a first stored probabilistic finite state machine model derived from sets of features of the results of the same sequence of operations when originated by a plurality of entities, matching the said test sequence of features against a second stored finite state machine model derived from sets of features of the results of the same sequence of operations when originated by the specific entity, and comparing the results of the matching steps to indicate whether the test sequence of operations originated from the specific entity.

According to a second aspect of the invention there is provided apparatus for verifying that a sequence of operations originated from a specific entity, comprising means for storing data specifying first and second finite state machines, the data for the first machine having been derived from sets of features of the results of a sequence of operations originated by a plurality of entities, the data for the second machine having been derived from sets of features of the results of the same sequence of operations originated by a specific entity, means for extracting a test sequence of sets of features from the results of a sequence of operations which are alleged to have been originated by the said specific entity, means for matching the said test sequence against the first and second said machines, respectively, and means for comparing results from the matching means to indicate whether the test sequence was originated by the said specific entity.

The specific entity is usually a person, although the entity may be an object, for example an object undergoing non-destructive testing when the sequence of operations may be signals originated by the object under test. As has been mentioned, where the entity is a person the sequence of operations may, for example, be the utterance of a sound or the signing of a signature. The sounds may be alpha-numeric characters or words and the characters or words may be uttered as isolated items, or connected items as in continuous speech.

The invention has the advantage that it tends to reduce false acceptances and false rejections in speaker verification.

Signals resulting from incoming speech may be digitized at relatively short intervals and processed over relatively long intervals to provide sets or "frames" of digital signals derived from spectral components. By rejecting some of these components before or after further processing, the effects of telephone link limitations and distortion can be reduced so that speaker verification over telephone systems is possible.

According to a third aspect of the invention, therefore, there is provided a method of speech verification or recognition including obtaining digital signals representative of speech, carrying out cepstral processing of the digital signals, and carrying out speech verification or recognition based on cepstral coefficients resulting from the processing but omitting the zero and/or first of the coefficients.

By using a gradient algorithm the finite state machine models employed by the invention, usually HMMs, may be refined when an appropriate method of finding a suitable partial differential is known. Such a method is described below.

Thus, according to a fourth aspect of the present invention there is provided a method of modifying Hidden Markov Models using a gradient based algorithm. Preferably a number of iterations are carried out, and after each iteration the modified models are tested against stored data to determine whether improvements have taken place, the processes finishing when improvements become insignificant. The invention also includes apparatus for carrying out the third and fourth aspects of the invention.

BRIEF DESCRIPTION OF THE DRAWINGS

Certain embodiments of the invention will now be described by way of example with reference to the accompanying drawings, in which.

DETAILED DESCRIPTION OF THE INVENTION

Figure 1:
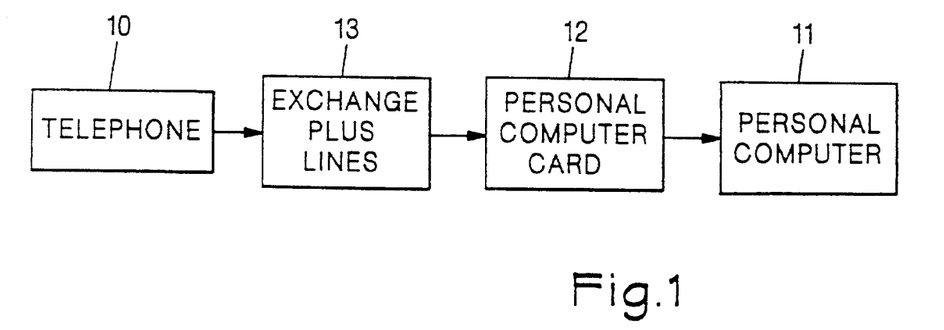
FIG. 1 is a block diagram of an apparatus according to the invention.
Figure 2:
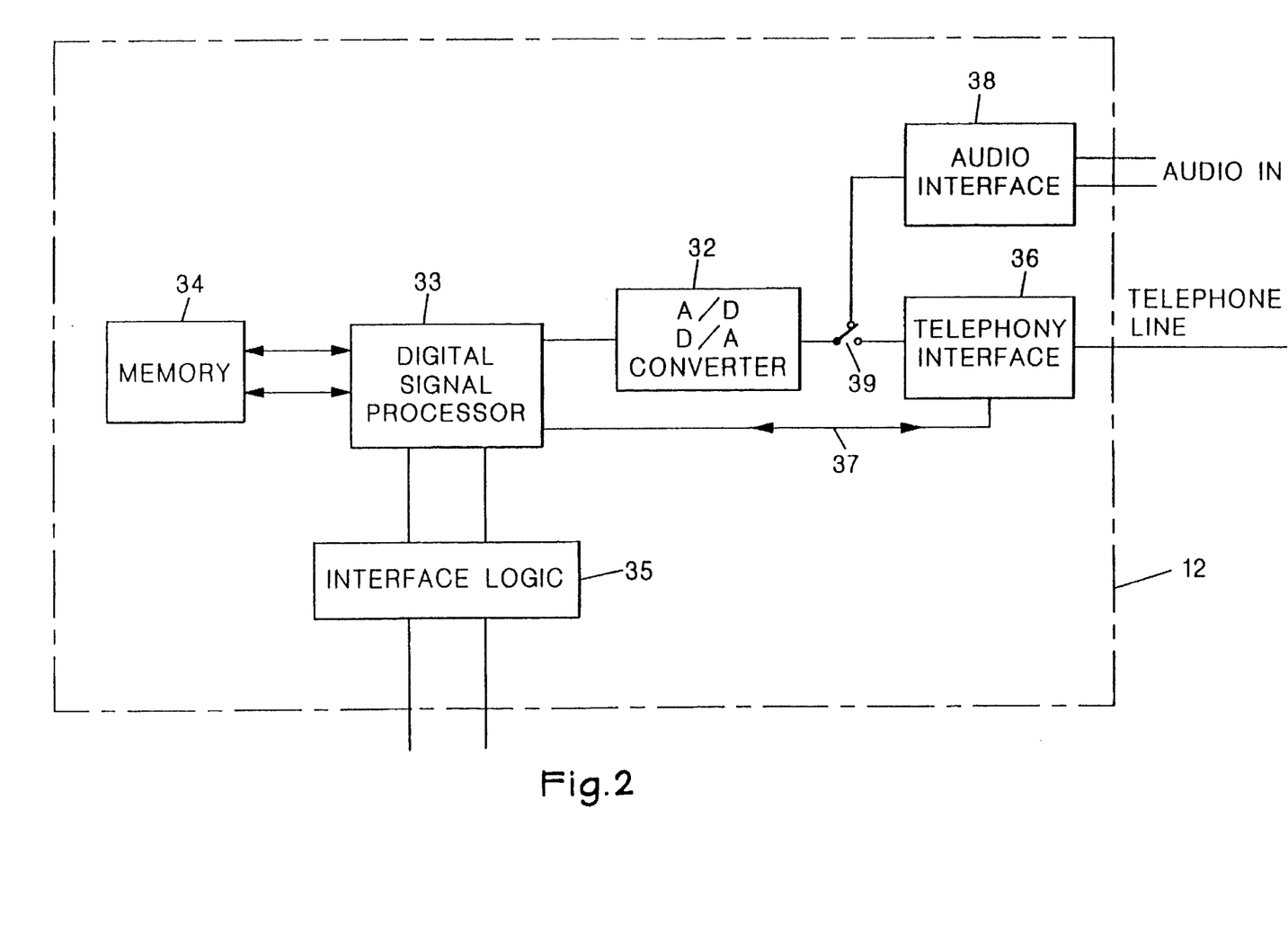
FIG. 2 is a block diagram of a computer card shown as a block in FIG. 1.

In the arrangement of FIG. 1, a person whose speech is to be verified may use a telephone 10 at a location remote from a personal computer 11 containing a circuit card 12 which together carry out verification and indicate the result. In general the telephone 10 will be connected by way of exchanges and telephone lines 13 to the input of the card 12 which contains an analog-to-digital (A/D) and digital-to-analog (D/A) converter 32 (see FIG. 2), and a digital signal processor (DSP) 33 in which the program for speaker verification and data for the program are stored. The card 12 also contains a memory 34, and interface logic 35 for coupling the DSP to a host computer such as the personal computer mentioned above. A telephony interface 36 converts from a two wire telephone line to four wires: an A/D input pair and a D/A output pair. The interface 36 also contains a circuit for ring detection which provides an output on a control line 37, and "on hook" and "off hook" operations at the beginning and end of telephone messages. An audio interface 38 includes a pre-amplifier allowing an audio input for the card 12 to be connected to a microphone. An output for connection to a loudspeaker is also provided to allow audio messages or synthesised speech as an alternative to screen messages. A switch 39 is operated as required to connect either the telephony interface or the audio interface to the converter 32.

The A/D samples incoming speech typically at a rate of 8,000 samples per second and spectral representations of the input samples are produced at a frequency called the frame rate, typically every 20 ms. Spectral representation is in the form of the outputs of a bank of narrow band filters each centred on a different frequency, with these frequencies spread across the spectrum of the incoming telephone signals. The use of a bank of filters for this purpose is well known, and the filters may for example be formed by discrete components or by digital filters achieved by programming the DSP, for example as described in Chapter 4 of the book "Digital Signal Processing Design" by A. Bateman and W. Yates, see particularly Section 4.27 including Example 4.2 on page 148. Table 1 gives an example of centre frequencies and bandwidths for a suitable filter bank having 11 filters.

TABLE 1

| Centre Frequency (Hz) | Bandwidth (Hz) |
|---|---|
| 198 | 198 |
| 395 | 198 |
| 596 | 204 |
| 804 | 214 |
| 1027 | 231 |
| 1268 | 252 |
| 1533 | 280 |
| 1829 | 312 |
| 2160 | 350 |
| 2534 | 407 |
| 3000 | 538 |

At each sample, each filter gives a power output and the DSP program sums these outputs over each frame to give a frame output for each filter.

The outputs of the filters are, in this embodiment, subjected to the known technique of cepstral processing which is described for example in the paper "Comparison of Parametric Representations for Monosyllabic Word Recognition in Continuously Spoken Sentences", by S. B. Davis and P. Mermelstein, IEEE Transactions on Acoustics, Speech and Signal Processing, Vol. ASSP-28, No. 4, August 1980, pages 357 to 366, see particularly page 359. Cepstral processing results in the derivation of a number of coefficients which can be regarded as descriptors for the spectrum of the speech signal. For example the first coefficient represents the total energy of the spectrum, the second coefficient represents the general slope of the spectrum with increase in frequency and the third coefficient gives an indication of how "peaky" the spectrum is. The following steps may be used to carry out cepstral processing: the logarithms of the outputs of the filters are calculated and then a discrete cosine transform is carried out on the log outputs.

Figure 3:
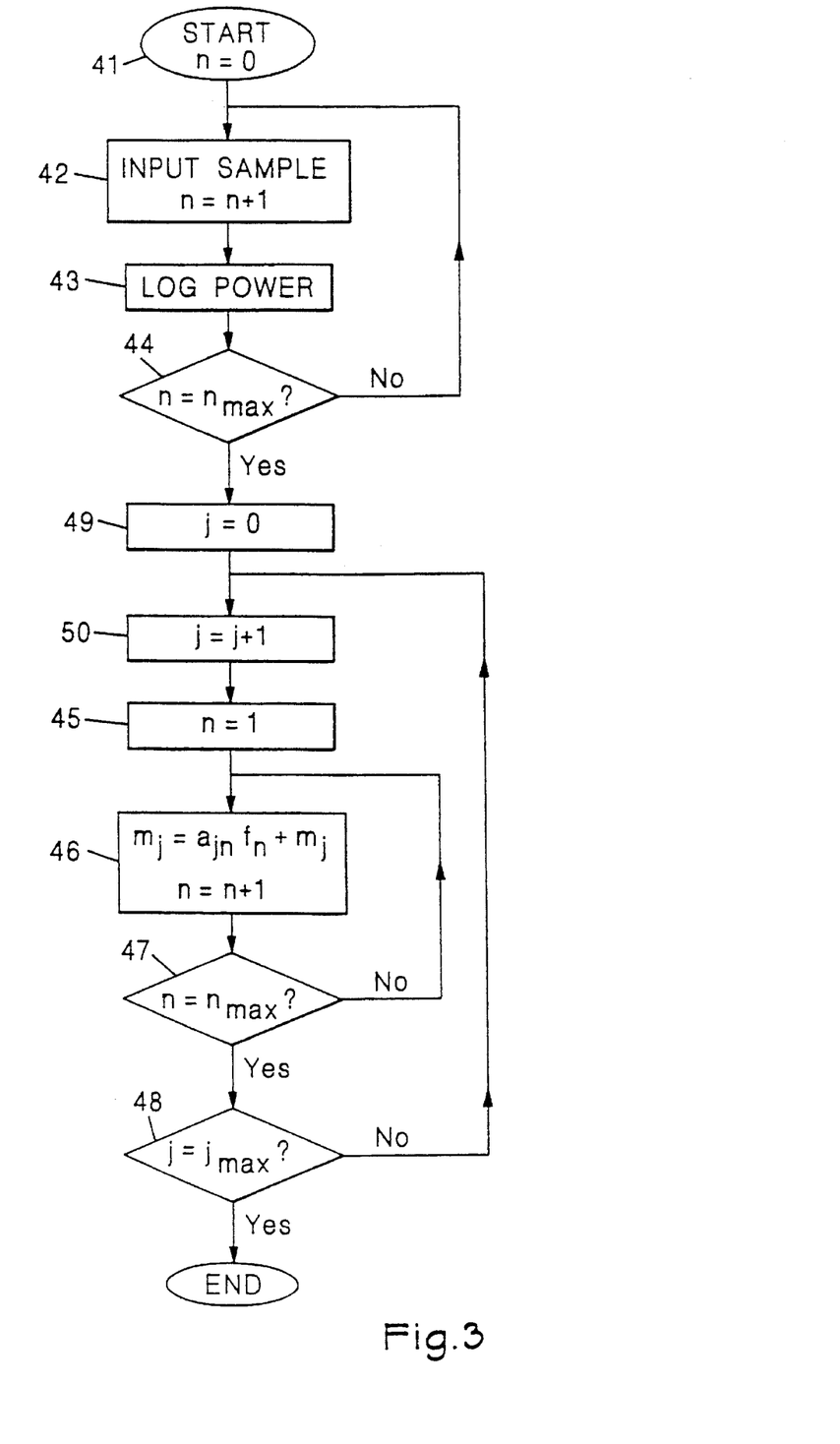
FIGS. 3 and 4 are flow charts showing how cepstral and related features can be extracted from signals representing sounds.

In FIG. 3 which shows an algorithm for cepstral processing, a variable n designating the filters in the filter bank is set to zero and then incremented (operations 41 and 42). The logarithm of the output power for each frame of the first filter is calculated and stored in an operation 43 and then the operations 42 to 43 are repeated for the other filters as n increases until under the control of a test 44 the logarithms of all the filter outputs have been stored.

The next part of the algorithm of FIG. 3 calculates and stores each of $m_j$ cepstral coefficients according to the expression $$m_j = \sum_{k=1}^{n} f_n \cdot \cos\left[ j(k - 1/2)\frac{\pi}{n} \right]$$

where $f_n$ is the log of the power output of the $n^{th}$ filter and j is the number of the cepstrum coefficient.

This expression is given in a different form as equation (1) on page 359 of the above mentioned paper by Davis and Mermelstein.

After setting n to 1 (operation 45) the $j^{th}$ cepstral coefficient is found by an operation 46 and a test 47 where a variable $m_j$ is increased each time n is incremented by adding the product of the logarithm of the output power of the $n^{th}$ filter and the appropriate cosine transform coefficient $a_{jn}$ $$\left( \text{which equals } \cos\left[ j(k - 1/2)\frac{\pi}{n} \right] \right),$$

so providing the sum of n such operations. Next a test 48 in conjunction with previous operations 49 and 50 causes the operations 45 and 46, and the test 47 to be repeated j times, so generating j cepstral coefficients.

The resulting representation of the spectrum has advantages in that the cepstrum can be readily processed for further purposes by giving different weightings to the coefficients. For example, to mitigate the effect of telephone line distortion on the spectrum of the speech signal, the zero and first cepstral coefficients, known as MFCC0 and MFCC1 may be given zero weights. Processing preferably also includes deriving an indication related to the rate of change of each coefficient (first order difference) and its second order difference. An algorithm for this purpose (see FIG. 4) begins by setting the number j of the coefficient to one in an operation 52 and setting (operation 53) a variable k nominally representing a particular recent frame to $-k_{max}$ where $k_{max}$ is the number of previous and succeeding frames relative to the frame k to be used in forming each $j^{th}$ first order rate of difference $d_j$.

Figure 4:
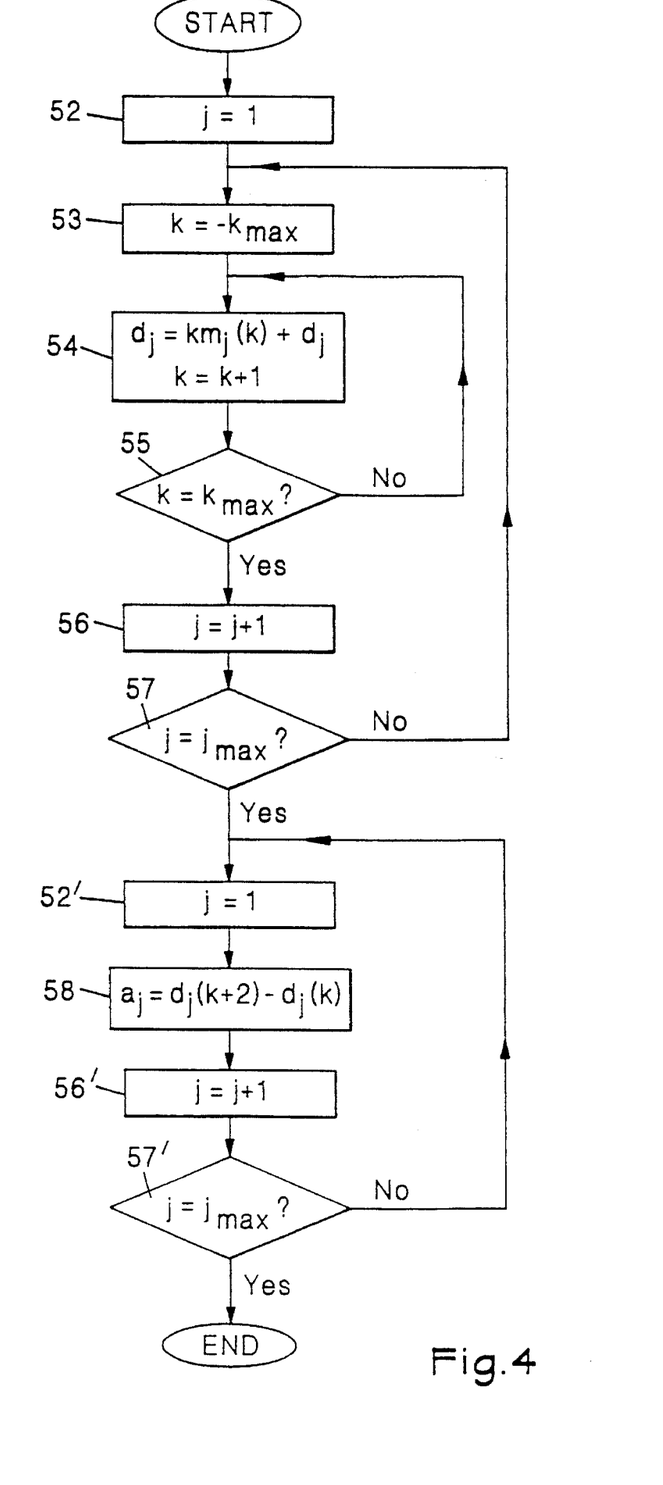

An operation 54 and a test 55 cause $(2k_{max}+1)$ iterations to occur of a calculation:

$$d_j = km_j(k) + d_j$$

where $m_j(k)$ is the $j^{th}$ coefficient of the $k^{th}$ frame. For example the first and last iterations of the five iterations when $k_{max}=2$ are:

$$d_j = 2m_j(-2) + 0, \text{ and}$$

$$d_j = 2m_j(2) + 1m_j(1) + 0 - 1m_j(-1) - 2m_j(-2) + 0, \text{ respectively,}$$

where the figures in brackets give the frame position relative to the $k^{th}$ frame.

By incrementing j (operation 56) and carrying out a test, the operations 54 and 55 are repeated until j first order differences have been obtained.

Other values may be used for $k_{max}$ and, in effect, $k_{max}=1$ is used to calculate the second order differences in the remainder of FIG. 4. With $k_{max}=1$, the operation 53, the incremental part of the operation 54 (k=(k+1)), the test 55 and the associated loop are not required. Controlling the difference calculation is by operations 52' and 56', and test 57' which are the same as 52, 56 and 57, respectively.

The second order $j^{th}$ difference $e_j$ is calculated in an operation 58 and uses $$e_j = d_j(k+2) - d_j(k)$$

to give $e_j$ in a single operation. The $e_j$ calculated in this way is for the nominal frame k but derived partly from a frame k+2 two frames later. The second order difference derived is a trend which is almost always nearly the same as could, alternatively, be obtained from using $d_j(k-1)$ and $d_j(k+1)$. Second order coefficients could be calculated with values of $d_j$ from more frames and first order coefficients could be calculated with values from two frames only.

At the end of processing which is known as "feature extraction" each frame is represented by a number of values which form elements in a "feature vector". There is one such vector for each frame. Typically in this embodiment there are 14 elements in each feature vector, 7 corresponding to the cepstral coefficients (two of which may be omitted, as mentioned above) and 7 corresponding to the first order differences of these coefficients. Preferably an additional 7 corresponding to second order differences are also used.

Feature extraction may be carried out by any suitable alternative method such as the known methods of linear prediction and discrete Fourier transform whose outputs may also be converted to the cepstrum of the speech signal.

Speaker verification in this invention depends on the use of Hidden Markov Models. Briefly, an HMM is a finite state machine, which in the field of speech recognition typically comprises from 3 to 10 states coupled by transitions, usually from one state to the next and from one state to itself. Each state has an associated probability distribution function (pdf) which allows the calculation of the probability that a given feature vector would be produced by the HMM when in that state. Each pdf is a multidimensional function specified by a plurality of pairs of mean values and variances each of which is derived from the normal distribution of an element in the feature vectors as is mentioned in more detail below.

Where, for example, a speaker is to be verified from a string of, for example, 5 digits then the DSP on the card 12 stores data for two sets of HMMs: the first set is means and variances derived from the nominally normal distributions of the elements of feature vectors of a large number of utterances of the digits 0 to 9 from many different persons (males and females) and the models in this set are known as world models; and the second set in which each model is derived from the nominally normal distributions of the elements of feature vectors of, typically, 5 utterances of each digit spoken by a person whose speech is to be verified. Thus there are as many models in the second set as there are speakers to be verified, these models being known as personal models. The data for the HMMs of these two sets is stored as means and variances in files in the memory of the DSP. The memory may also store probabilities of transition from one state to another and also from one state to itself, these transition probabilities also being calculated in a known way from the digit utterances.

In the algorithm for speaker verification (FIG. 5) which is carried out by the DSP, a person whose speech is to be verified enters an identification code into the computer 11. The card 12 then causes the computer to carry out an operation 15 to prompt for a random digit by displaying a request for this digit to be spoken or by generating a voice synthesised request. When the person utters the digit a sequence of feature vectors is extracted and stored in an operation 16 and the probability of this sequence being generated by the world model for the digit prompted is calculated in an operation 17. This probability is calculated using the Viterbi algorithm, which again is well known in the field of speech recognition. Briefly the Viterbi algorithm considers each feature vector in the sequence and the probability that each state of the HMM could have produced that vector in deriving a probability. The Viterbi algorithm takes into account the transition probabilities from one state to another and the probability calculated from the previous state. In this way the Viterbi algorithm finds the most likely combination of states and transitions and calculates a log probability that a sequence of feature vectors matches a particular HMM model. The Viterbi algorithm and its use in calculating the probabilities from HMM models is described in Chapter 8, particularly Sections 8.4 and 8.11 of the book "Speech Synthesis and Recognition" by J. N. Holmes, published by Van Nostrand Reinhold (UK) in 1988.

Figure 5:
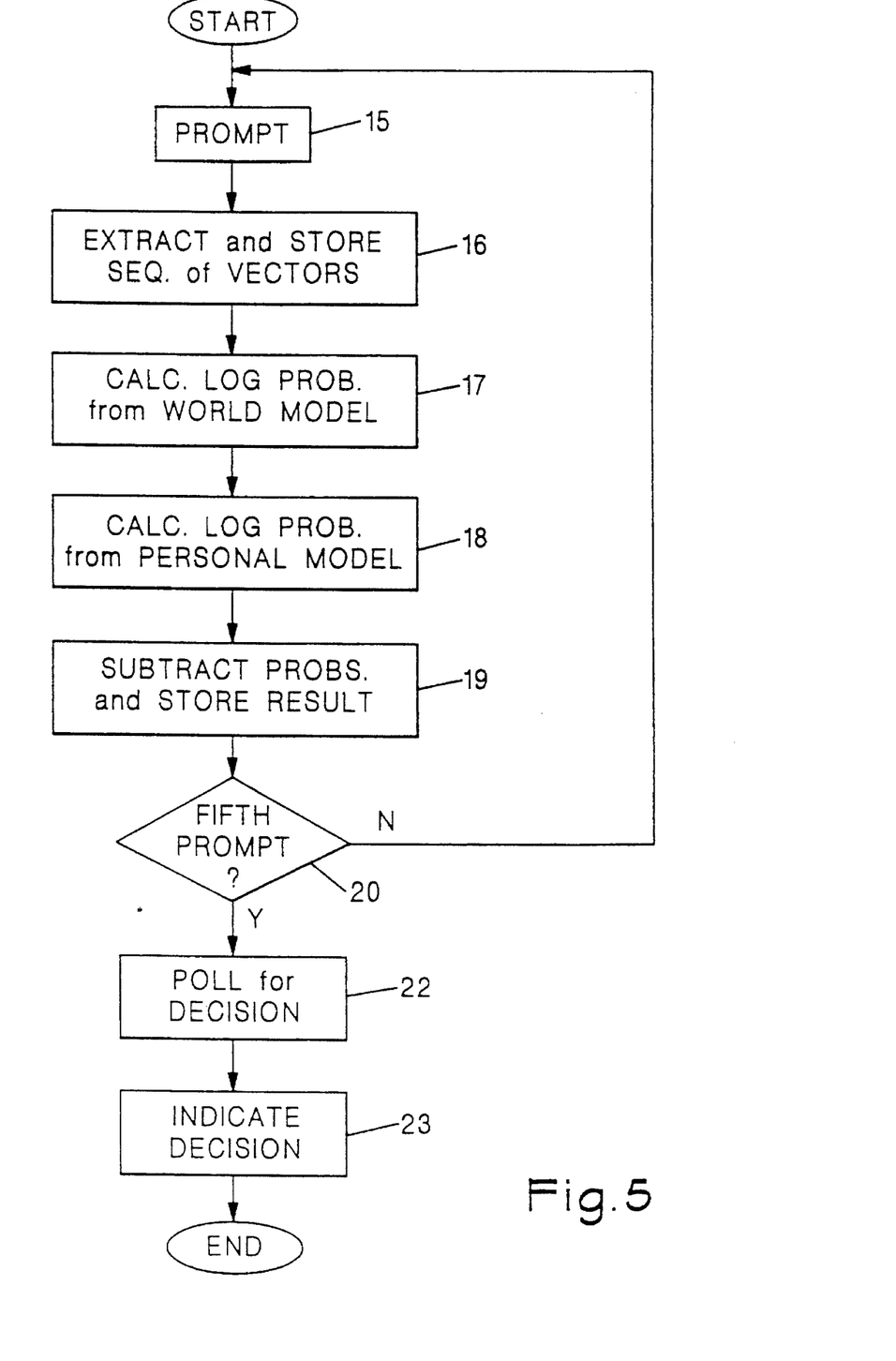
FIG. 5 is a flow chart showing speaker verification for isolated words, FIGS. 6 and 7 form a flow chart showing the calculation of probabilities in speaker verification using connected words.

The log probability that the sequence of vectors could have been generated by the alleged speaker's personal model of the prompted digit is now calculated in the same way (operation 18), the calculated world model log probability is subtracted from the calculated personal model probability and the result is stored (operation 19). A positive value for this result indicates that the personal probability is greater than the world probability and that therefore it is more likely that the digit was uttered by the alleged speaker than by an impostor.

A test 20 is used to determine whether the last prompt in the operation 15 was, in this example, for the fifth in a string of random digits. If not then operations 15 to 20 are repeated but otherwise an operation 22 is carried out in which the results stored in the operation are compared and a decision on verification is given on the basis of a poll with the majority of acceptances or rejections determining the decision. The decision is indicated on the display of the computer 12 or by means of a voice synthesised message in an operation 23 and the algorithm ends.

The beginning and end of an utterance is found by comparing the probability that the features currently extracted could have been generated by a "silence" state, defined by means and variances, with the probability that the features could have been generated by the beginning and end state, respectively, of an HMM representing an expected word.

Improvements in speaker verification can usually be achieved if a phrase of connected words, that is continuously spoken words, is used in preference to isolated words. For example five numerals could be spoken as a continuous phrase or a string of five numerals could be split into two continuously spoken parts. In recognition, a computer or such as the P.C 11 may be programmed to display a prompt for the required phrase so that the model of the expected response can be formed by joining models for individual words end to end to make an overall model in the form of a string of word models. It is preferable, however, to allow for silences between words by including a state representing silence between the end of one word model and the beginning of the next word model and to allow transitions either directly from one word model to the next or by way of the silence state which may also have a transition to itself to allow for longer silences.

Figure 6:
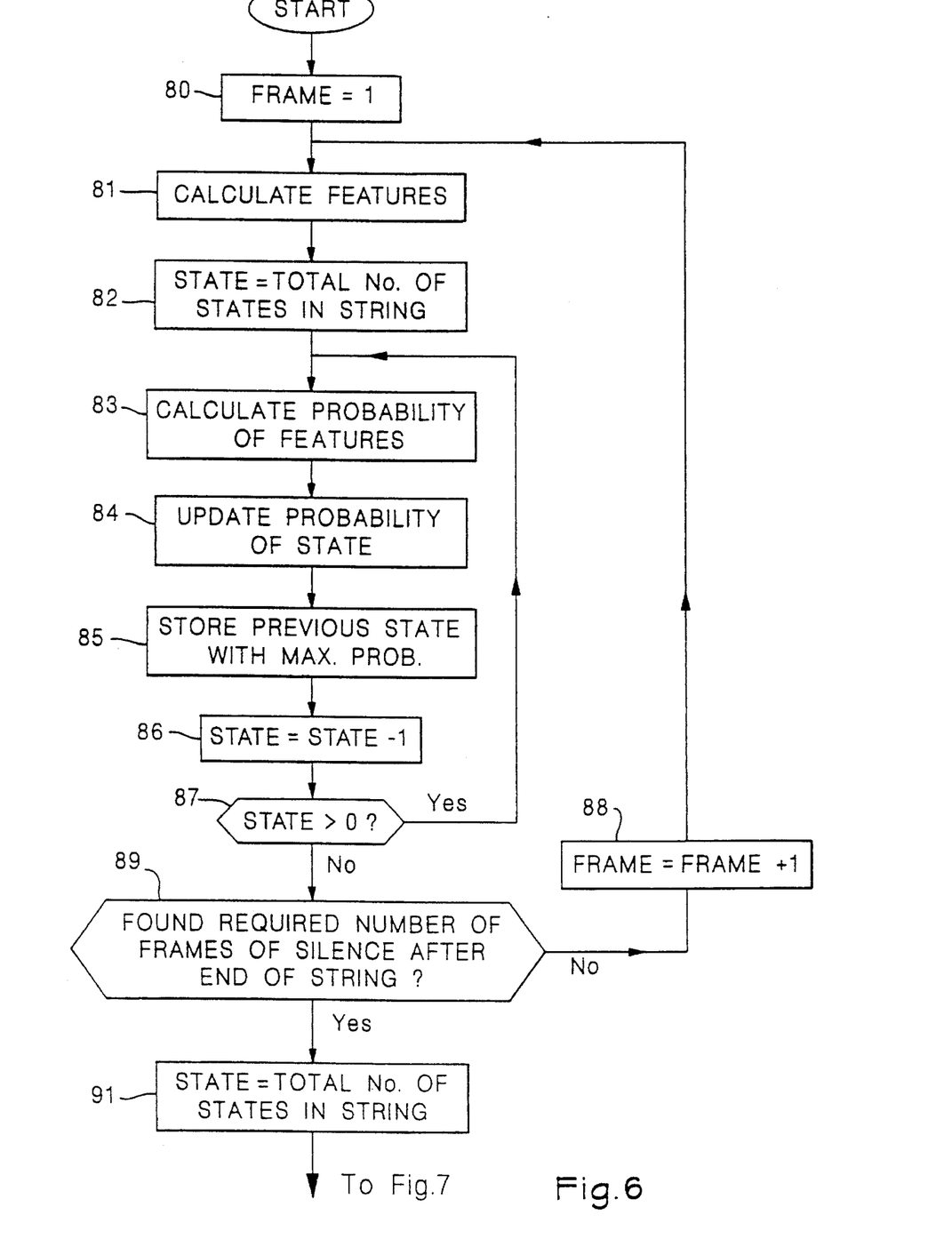
Figure 7:
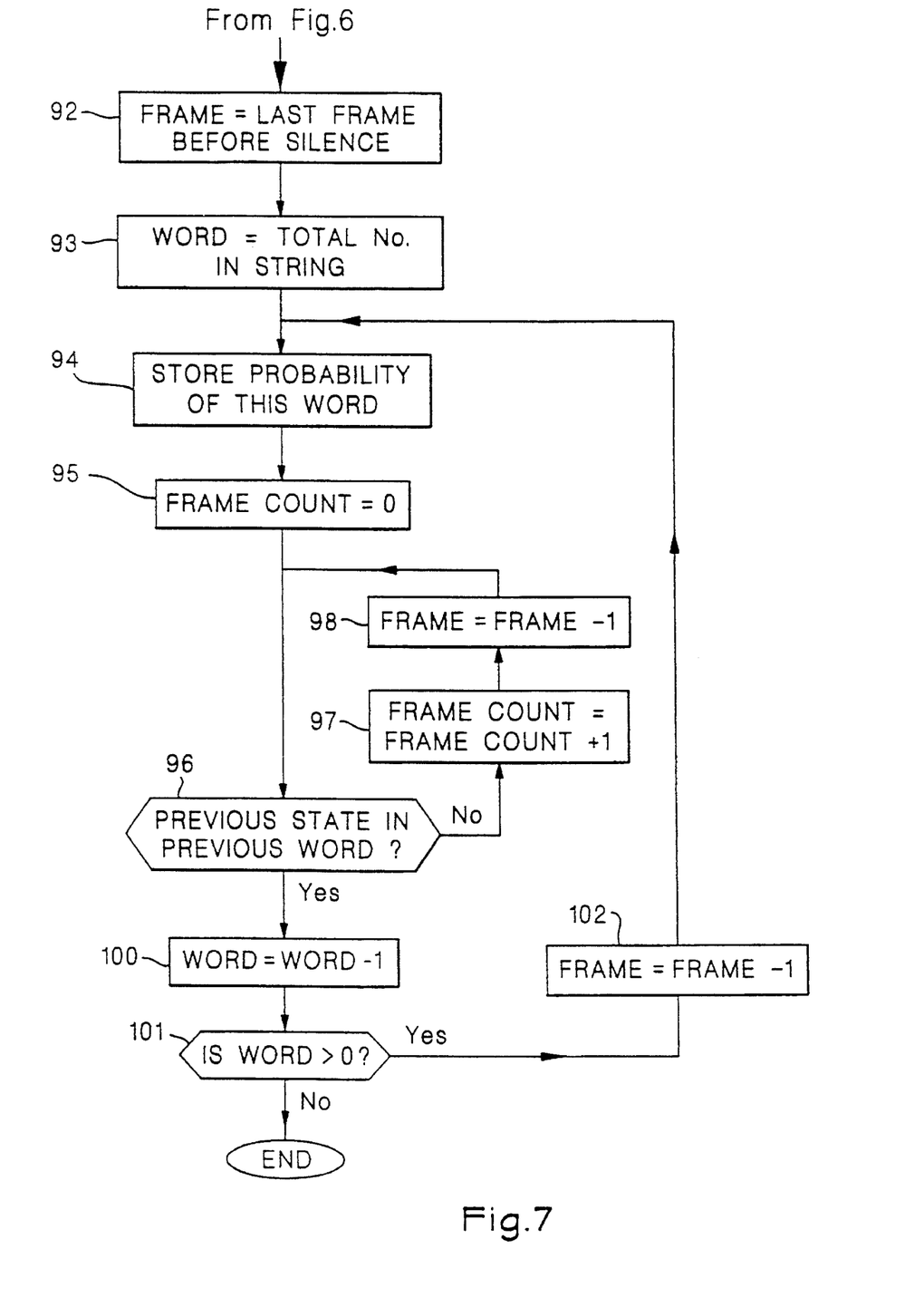

FIGS. 6 and 7 are in the form of a flow chart for calculating probabilities of connected words. In FIG. 6 each incoming frame in a complete utterance is dealt with in turn to calculate the probability, for each state in the string of models, that a sequence of states ending with that state could have generated the utterance. FIG. 7 uses these probabilities to segment the utterance into words and extract the probability that each of these words was spoken.

In operation 80 a variable FRAME is set to 1 corresponding to the first frame of an utterance received, and then feature extraction is carried out as described above in connection with FIGS. 3 and 4 (operation 81). Since the next group of operations is to be carried out for every state in the string of models a variable STATE is set to the total number of states in this string (operation 82) so that in this group of operations the last state in the string is considered first. The probability that the features of frame 1 could have been generated by this last state is calculated in an operation 83 from the probability distribution for this state. This probability is now added to the maximum probability obtained in previous iterations for states having transitions to this last state (operation 84), this maximum including the multiplication by the probability of the transition to the last state as calculated by addition of the log of the transition probability. In the first iteration there are no such previously calculated probabilities but it can be seen that as the operation 84 is repeated a type of Viterbi algorithm is operated. Next an operation 85 is carried out in which the identification of the state which had this previous maximum probability is stored. An operation 86 and a test 87 cause operations 83, 84 and 85 to be repeated for every state in the string. Having dealt with the first frame the frame number is incremented, in an operation 88, unless a test 89 for a period of silence of about half a second indicates that the response has ended. Thus while frames of the response are still available the operations 81 to 86 are repeated continuously.

When silence is detected by the test 89 the STATE variable is again set to the total number of states in the string of models in an operation 91, the variable FRAME is set to the last frame occurring before silence and a variable WORD is set to the total number of words represented by the string of models (operations 92 and 93). The probability of the last word in the utterance is the probability calculated in the operation 84 for the last state in the string and the last frame in the utterance. An operation 94 stores this probability. A variable FRAME COUNT is set to zero in an operation 95 and then a test 96 is carried out to determine whether the previous state of this word model is in the previous word model as indicated by the identification stored in the operation 85. If not the frame count is increased by 1 and the frame number is decreased by 1 in operations 97 and 98. The test 96 now determines for the previous frame of the last word whether, from the indication for this frame stored in the operation 85, the previous state was in the last or previous word model. This process continues until the test 96 gives a positive response indicating that the algorithm has backtracked through all the states in the last word to the beginning of the word. The number of frames in the word is available from the variable FRAME COUNT. The variable WORD is now decremented (operation 100) and if all the words in the string have not been considered as indicated by a test 101, the operations 94 to 100 are repeated for the previous word in the string after decrementing the variable FRAME in an operation 102. When the outcome of the test 101 indicates that all the words in the string have been considered the probabilities of each word are available as stored in the operation 94 and these probabilities can be considered as above in an acceptance calculation to give an indication as to whether the speaker is verified as genuine or not.

Many variations and alternatives to the various flow charts are apparent and one such alternative for FIG. 5 or in connected speech is to require the speaker to utter all, or part, of a personal identification number (PIN) having identified himself to the computer so that the computer is "aware" of the expected digits and uses a program in which world and personal models of these digits in calculating probabilities and deciding on the verification result. As an additional security measure a speech recognizer algorithm, of which many are known, may be used to recognize the PIN. Another alternative is to allow the speaker to utter a string of digits which he chooses, when the DSP employs a program which first recognises each digit in the string and then calculates probabilities from the world and personal models of these digits. Instead the program may compare each sequence of vectors against every world and personal model and select the highest probability pair relating to the same digit and base a decision on probabilities calculated from this pair.

As an alternative to the operations 19 and 22, a program may be used in which the probabilities derived from the world models of each of, for example, five digits may be multiplied together and compared with a similar product derived by matching feature vectors against personal models. If the product of probabilities from the world models is smaller than the product from the personal models then the speech is verified.

Any set of feature vectors which gives rise to probabilities calculated from the world and personal models which are below a certain level are rejected to prevent spurious or arbitrary utterances giving a false validation.

Of course speaker verification using the invention, for example by the methods described above, is not limited to the utterance of digits. Other characters such as letters from the English or other alphabets may be used, as may be complete words if either each character of the word is spoken separately or a known continuous speech recognition algorithm is used to separate one character or word from another.

In building the models for the digits, a set of world models for each digit is built using the Baum-Welch re-estimation process which is another well known technique in the field of speech recognition. These initial world models are common to all speakers. Personal models for each of the digits are then constructed using the same process from, typically, five examples of each of the digits collected for each person whose speech is to be verified.

Derivation of the world and personal models is now described in more detail.

Each world model is derived from a number of utterances ($Q_{MAX}$) of the digit represented by that model each taken from a different speaker.

Figure 8:
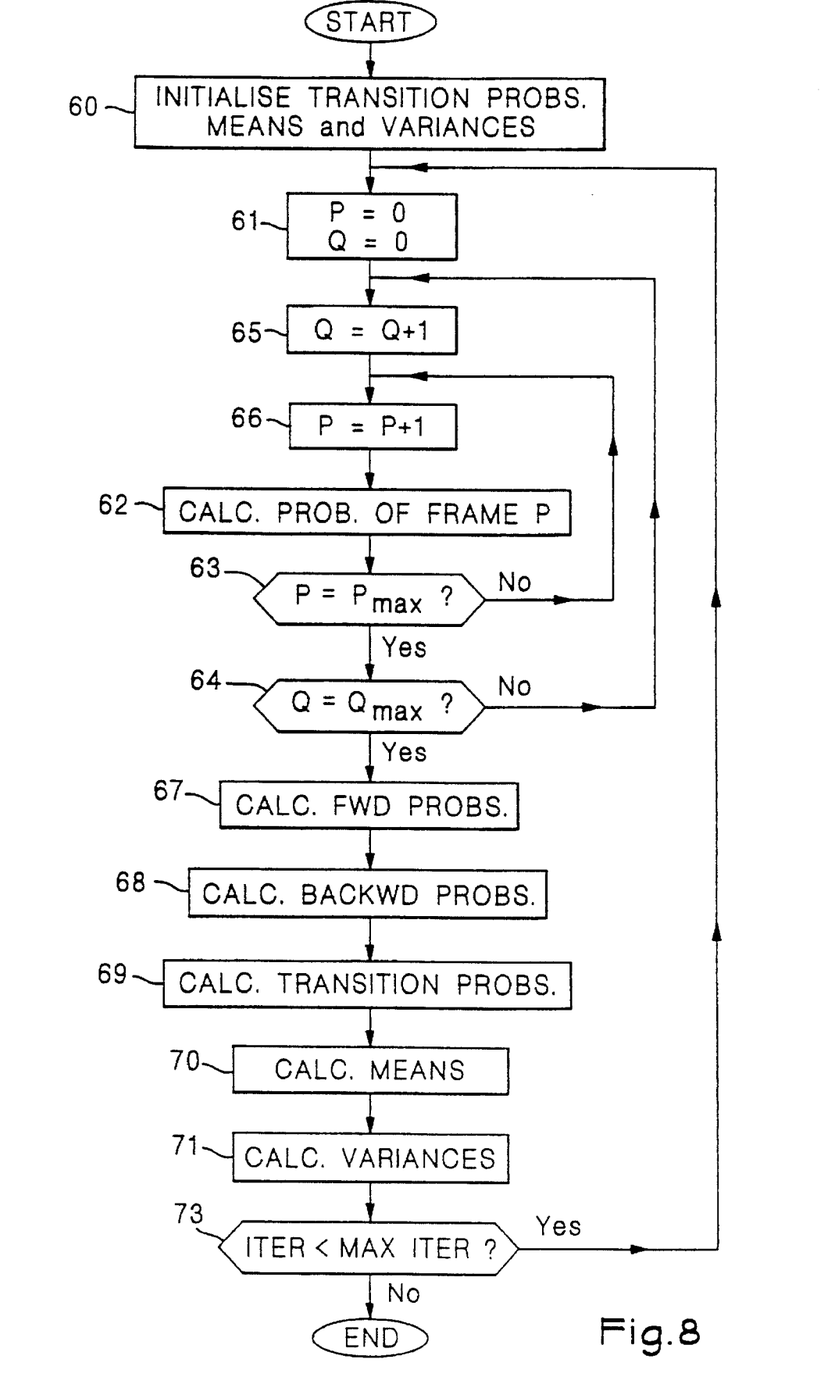
FIG. 8 is a flow chart showing the construction of HMM models.

Referring to FIG. 8, the transition probabilities, means and variances are initialised in an operation 60 as follows. The transition probabilities a(i)(i) from state i to itself and the transition probabilities a(i)(j) from state i to state j are initialised to a(i)(i)=0.5 a(i)(j)=0.5

For the purpose of initialisation the frames of each utterance are assigned linearly to the HMM states so that each state has, typically, one tenth of the frames ($P_{MAX}$) of the utterance assigned to it. Assuming each frame has k features the mean μ(j)(k) for the normal or Gaussian distribution of state j feature k is initialised from $$\mu(j)(k) = \frac{\Sigma x(k)}{Sj}$$

where the summation is taken over all frames assigned to state j and $S_j$ is the total number of frames assigned to j.

The variance $\sigma^2(j)(k)$ of state j feature k is calculated using $$\sigma^2(j)(k) = \frac{\Sigma(x(k) - \mu(j)(k))^2}{Sj}$$

where the summation is taken over all frames assigned to state j and $S_j$ is the total number of frames assigned to j.

Next P and Q are set to zero in an operation 61 to allow the probabilities of each of the $P_{MAX}$ frames of each of the $Q_{MAX}$ utterances of the digit to be calculated given the HMM for that model in an operation 62 which is repeated $P_{MAX}\cdot Q_{MAX}$ times by operation of tests 63 and 64, and increment operations 65 and 66.

Five operations follow, all according to the Baum-Welch described in Chapter 8 of the above mentioned book by J. N. Holmes. These operations are calculate the forward probabilities (operation 67),
calculate the backward probabilities (operation 68),
calculate new transition probabilities (operation 69),
calculate new means (operation 70), and
calculate new variances (operation 71).

The operations 69, 70 and 71 provide a new re-estimated model which is used, for a number of iterations, to allow the calculation of frame probabilities from the $Q_{MAX}$ utterances to be recalculated followed by repetitions of the operations 67 to 71. The number of iterations is determined by a test 73 using a value "MAX ITER" which is typically about 10 but alternatively iteration may be continued until a test (not shown) indicates that convergence of the transition probabilities, means and variances has occurred. These parameters as finally calculated then define the HMM world model for the digit whose utterances were used.

The personal HMMs typically have 7 states and are also left to right models. Again each feature in each state is described by a normal or Gaussian distribution.

HMM parameters can be estimated by the Baum-Welch algorithm or by the Viterbi algorithm. Since the Viterbi algorithm is simpler and faster it is used for the personal HMMs where a person being enrolled for speaker verification has to wait until the enrolment process is complete.

The algorithm used for the personal HMMs is the same as FIG. 7 except the operations 67, 68 and 69 are replaced by an operation which calculates the forward probabilities using the Viterbi algorithm and a following operation to trace back to find the best sequence of states for each word. Also the operations 70 and 71 are carried out in a different way as explained below.

Each personal HMM is built from 5 utterances of the digit it models so $Q_{MAX}=5$. The transition probabilities, means and variances are initialised in the same way as for the world models but while the means and variances are re-estimated the transition probabilities remain fixed during the re-estimation.

The Viterbi operation is as described in the above mentioned Section 8.4 of Chapter 8 of the book by J. N. Holmes. The trace back operation keeps track of the state giving rise to the maximum value for each frame of each word and shows the sequence of states having the highest probability for each word. The frames for each word are assigned to the best fitting state found on trace back.

The new mean $\bar{\mu}(j)(k)$ for feature k in state j is re-estimated in the operation 70 using the frames assigned to state j as follows:

$$\bar{\mu}(j)(k) = \frac{\Sigma x(k)}{Sj}$$

where the summation is taken over all frames assigned to state j and $S_j$ is the total number of frames assigned to j.

Similarly the new variance $\bar{\sigma}^2(j)(k)$ is re-estimated in the operation 71 for feature k of state j using the frames assigned to state j as follows:

$$\bar{\sigma}^2(j)(k) = \frac{\Sigma(x(k) - \bar{\mu}(j)(k))^2}{Sj}$$

where the summation is taken over all frames assigned to state j and $S_j$ is the total number of frames assigned to j.

The re-estimation process is repeated for the number of iterations required. This is either a fixed number, for example 3, or until the model has converged.

Continuous speech can also be used in deriving the world and personal models and the algorithms of FIGS. 6 and 7 may be used for this purpose when during training a prompt again shows a string of numerals which are to be spoken. The frame count available from the operation 97 when the test 96 indicates that the end of a word has been reached is used to segment the words and to identify the frames in each word. Since the initial word models are based on the features of these frames, the operation 81 also stores the features of each frame when the world and personal models are being derived. As before the frames are initially allocated linearly to model states to allow means and variances to be calculated for initialisation and then the models are re-estimated using either the Baum-Welch or the Viterbi algorithm.

The resulting world and personal models are used for the operation of the system described above but improvements in discrimination between personal models and the world model, and hence the overall operation of the system, can be expected if the models are further adapted using discriminative training to make best possible use of the differences between sets of utterances used in forming the personal models and the world models rather than using the utterances to improve the likelihood results provided by the models. The preferred way of doing this is to use a gradient algorithm but, as is mentioned below, for this purpose the rate of change of the likelihood function for the output probability of a model as a function of means and variances is required. The rate of change of the output probability has to be calculated with respect to each state probability in turn. To do this, the error in the output (that is the difference between the actual and required output) is taken and the error back-propagation algorithm for the perceptron (a neural net concept) is used to work out the appropriate error derivative with respect to a given state. Treating a number of Markov models as a single unit and then using multi-layer perceptron (MLP) error back-propagation is described by J. S. Bridle in his paper "Alpha-nets: a recurrent 'neural' network architecture with a Hidden Markov Model interpretation", Speech Communication, Vol. 9, No. 1, February 1990, pp 83–92. Each pair of models, the personal model and the world model, for each digit is treated as an example of an alpha-net and the alpha-net training technique is used to increase discrimination between the two models. When the discrimination has been maximised the models are ready to be used for the process of verification.

The Alpha algorithm, used in the application of HMMs to speech recognition, computes sums over alternative state sequences. This Alpha computation can be thought of as performed by a particular form of recurrent network which is called an alpha-net. The parameters of the network are parameters of the HMMs such as means, variances. The alpha calculation $$\alpha_{jt} = b_{jt} \sum_1 a_{ij} \alpha_{i_{t-1}}$$

computes $\alpha_{jt}$ the likelihood of the model generating all the observed data sequence up to and including time t, in terms of $b_{jt}$ the likelihood of it generating the data at time t given that it is in state j at time t, $a_{ij}$ the probability of state j given that the state at the previous time was i, and the $\alpha$'s at the previous time. When all the input sequence has been processed the value of $\alpha$ for the final state of each model is the likelihood of all the data given that model. For any given word we have two models: that for the individual person gives us $L_p$, that for the rest of the world gives us $L_w$. The probability $P_p$ that the given data was produced by the supposed person is now computed using Bayes' rule and the prior probability P of the person (that is the probability, determined by previous factors, that the word is spoken by the expected speaker), $$P_p = \frac{p \cdot L_p}{p \cdot L_p + (1-p)L_w}$$

During training the prior probabilities reflect the amount of training material of each kind, that is expected speaker trials and other speaker trials. During use the prior probabilities will depend on other factors.

Figure 9:
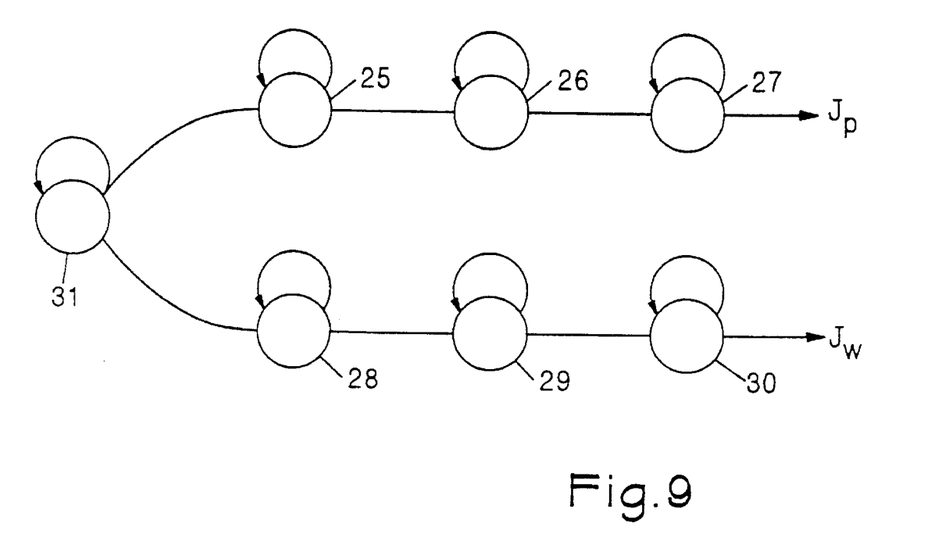
FIG. 9 is a diagram illustrating an alpha-net which may be used in modifying HMMs employed in the invention.

An example of an alpha-net is shown in FIG. 9 where the personal model of a digit includes three states 25, 26 and 27 with transitions between the states and each state having a transition to itself. The corresponding world model of the same digit has states 28, 29 and 30 with similar transitions. The alpha-net is formed by assuming an initial silent state 31 and transitions from this state to the two models. The outputs of the net represent the probability of the digit when uttered being generated by the personal and world models, respectively. The maximum discrimination when a word is uttered by the person whose speech is to be verified occurs when $P_p=1$ and $P_w=0$. Thus the alpha-net is to be optimised to approximate to this result and the contrary result of $P_p=0$ and $P_w=1$ when the digit is spoken by someone else. Adaption is by changing the means and variances for each of the states 25 to 30 to give optimum results and the technique used for training makes use of the identity of the Baum-Welch backward pass algorithm and the MLP back propagation of partial derivatives.

Use is made of a log probability score $$J = -\log P_c,$$

where the correct class is c (c=p or c=w) which can be optimised using the gradient algorithm.

To simplify the means (m) and standard deviations ($\sigma$) according to a simple sign of gradient rule the following equations can be used $$m_j(t) = m_j(t-1) - \xi \, \text{sign}\left(\frac{\partial J}{\partial m_j}\right), \qquad \text{equation 1}$$

and $$\sigma_j(t) = \sigma_j(t-1) - \xi \, \text{sign}\left(\frac{\partial J}{\partial \sigma_j}\right). \qquad \text{equation 2}$$

where the subscript j refers to the $j^{th}$ state in a model, $\xi$ is a coefficient which controls the rate of adaption and the last part of the last term of the equations signifies that the coefficient is to be multiplied by the sign of the rate of change. Alternatively the full gradient algorithm may be used when the equations are $$m_j(t) = m_j(t-1) - \xi \left(\frac{\partial J}{\partial m_j}\right), \qquad \text{equation 3}$$

and $$\sigma_j(t) = \sigma_j(t-1) - \xi \left(\frac{\partial J}{\partial \sigma_j}\right). \qquad \text{equation 4}$$

The adaption rate can be decreased periodically by changing the value of $\xi$ by deducting a fixed amount from $\xi$ or by taking a proportion of $\xi$.

In order to use these equations it is necessary to be able to calculate the partial differentials which they include.

By using the equation $$\frac{\partial J}{\partial m_j} = \frac{\partial J}{\partial L_{wj}} \cdot \frac{\partial L_{wj}}{\partial m_j}$$

where $L_{wj}$ is the likelihood of the $j^{th}$ state of the model, it can be shown that $$\frac{\partial J}{\partial m_j} = \frac{1}{\sigma_j^2} (P_{wj} - \delta_{cwj}) \frac{\sum_t \alpha_{jt}\beta_{jt}}{\sum_j \sum_t \alpha_{jt}\beta_{jt}} (\hat{m}_j - m_j) \qquad \text{equation 5}$$

where $P_{wj}$ is the probability of the $j^{th}$ state of the world model,
$\delta_{cwj}=1$ if w=c, otherwise 0, and
$\hat{m}_j$ is the Baum-Welch re-estimate of the mean.
By using the equation $$\frac{\partial J}{\partial \sigma_j} = \frac{\partial J}{\partial L_{wj}} \cdot \frac{\partial L_{wj}}{\partial \sigma_j}$$

it can be shown that $$\frac{\partial J}{\partial \sigma_j} = \frac{1}{\sigma_j^3} [P_{wj} - \delta_{cwj}] \frac{\sum_t \alpha_{jt}\beta_{jt}}{\sum_j \sum_t \alpha_{jt}\beta_{jt}} [\hat{\sigma}_j^2 - \sigma_j^2] \qquad \text{equation 6}$$

where $\hat{\sigma}_j$ is the Baum-Welch re-estimate of the variance.

Thus to improve the discrimination between a personal model and the world model for a digit, the equations 1 and 2, or 3 and 4, with 5 and 6 are used repeatedly to calculate new means and variances for all states of the two models. The result is a pair of models: a modified personal and a corresponding world model. Next sequences of stored vectors representing the digit when spoken by about 50 speakers other than the speaker corresponding to the personal model are used to test for improvements in the discrimination afforded by the modified models. The process is then repeated for the models of every other digit so that a pair of models is obtained for every digit. By applying the stored sequences of vectors to one of the pairs of models two distributions of output probabilities are obtained, one corresponding to the world model and one corresponding to the personal model. In general the two distributions overlap and where overlap occurs there is a region of uncertainty or error. By comparing the overlap of the distributions before and after models are modified by the above process a check can be made to determine whether an improvement has occurred. This checking process is carried out for all pairs of models. As a result adjustments to $\xi$ can be made, if necessary, and the process of recalculation of all models can be carried out again in a further iteration to obtain further improvements. After a number of iterations has been carried out it is found that further iterations provide only negligible improvements and the models are then in their final state ready for use.

Having described several specific examples it will be clear that the invention can be put into operation in many different ways and for many different purposes. Non-destructive testing has been mentioned and the invention may be applied to recognising specific written words or letters where the words or letters are modelled by HMMs. Speaker verification has applications other than by way of telephone links; for example in access control both for locations and buildings but also computers. Applications of the invention also occur in recognising spoken PINs for cash dispensing machines.

The references given in this specification form part of, and are hereby incorporated into, the specification.

We claim:

1. A method of verifying that a sequence of operations originates from a specific entity, comprising the steps of extracting a test sequence of sets of features of the results of the operations, one set corresponding to each operation, matching the said test sequence of sets of features against a first stored finite state machine model derived from sets of features of the results of the same sequence of operations when originated by a plurality of entities, matching the said test sequence of features against a second stored finite state machine model derived from sets of features of the results of the same sequence of operations when originated by the specific entity, and comparing the results of the matching steps to indicate whether the test sequence of operations originated from the specific entity.

2. A method according to claim 1 wherein the entity is a person and the sequence of operations is the utterance of sequences of sounds.

3. A method according to claim 2 wherein each feature comprises a multi-element vector in which the elements together provide a representation of the sequence of sounds in an interval, and the set of vectors represents the sequence of sounds over a succession of the said intervals.

4. A method according to claim 2 wherein the utterance is the utterance of an item chosen from an alpha-numeric character and a word.

5. A method according to claim 4 wherein matching the said test sequence against a first stored finite state machine model comprises matching against a selected one of a plurality of first stored finite state machines models each derived from respective utterances of an item when uttered by each of a plurality of persons, and matching the said test sequence against a second stored finite state machine model comprises matching against that one of a plurality of second finite state machine models which is derived from the same item as the said selected one model, each second model being derived from utterances of a respective item when uttered by a specific person.

6. A method according to claim 5 wherein comparing the results of the matching step is by comparing probabilities calculated for each of a plurality of utterances from first and second said models derived from utterances of the same items, and indicating whether the plurality of utterances was from the specific person on the basis of the majority of results of the probability comparisons.

7. A method of speaker verification including prompting a speaker to utter a series of isolated or connected items chosen from alpha-numeric characters and words, carrying out a method according to claim 5 for each utterance made in response to prompting.

8. A method according to claim 5 wherein matching the said test sequence includes for each of the first and second finite state machine models calculating for each state in that finite state machine model the maximum probability that a sequence of states, obtainable from that finite state machine model and ending in that state, could generate the test sequence, determining the end of each item in the sequence of sets of features based on the said maximum probability for each state, using the said maximum probability for each state at the end of an item as the probability of that item, and comparing the result of the matching steps includes comparing the maximum probabilities for each item as obtained for the first and second finite state machine models.

9. A method according to claim 2 wherein the utterance is the utterance of a string of connected spoken items chosen from alphanumeric characters and words.

10. A method according to claim 9 wherein matching the said test sequence against a first stored finite state machine model comprises matching against a model comprising a stored item model for each item in the utterance, the item models being serially linked and each derived from respective utterances of that item when uttered by each of a plurality of persons, and matching the said test sequence against a second stored finite state machine model comprises matching against a model comprising a stored item model for each item in the utterance, the item models being serially linked and each derived from respective utterances of that item when uttered by a specific person.

11. A method according to claim 2 wherein each matching step comprises the calculation of a probability, and comparing the results of the matching steps is by subtracting one log probability from another, the sign of the result indicating whether the utterance was from a specific person.

12. A method according to claim 1 wherein the entity is a person and the sequence of operations is the writing of a word or letter.

13. A method according to claim 1 wherein extracting the test sequence includes cepstral processing to provide features in the form of cepstral coefficients.

14. A method according to claim 13 wherein the zero cepstral coefficient is omitted from the sets of features.

15. A method according to claim 13 wherein the first cepstral coefficient is omitted from the sets of features.

16. A method according to claim 13, wherein extracting the test sequence includes providing a set of power values for each feature in which each power value represents the power of sound in one of a series of equal intervals over a respective frequency band, providing cepstral processing for the power values by calculating a logarithm value for each power value and carrying out a cosine transform on the logarithm values, and using at least some of the resulting cepstral coefficients as respective said features.

17. A method according to claim 16 including, for at least one cepstral coefficient, determining first difference related features based on values of the said one coefficient as derived from a number of the said sets of power values which occur in different said intervals, and using the first difference related features as features of the said sets of features.

18. A method according to claim 17 including deriving a number of second difference related features based on a plurality of first difference related features derived from different values of one cepstral coefficient, and using the second difference related features as features of the said sets of features.

19. A method according to claim 18, wherein the second difference related feature is derived by calculating the difference between alternate first differences in a series derived from the series of cepstral coefficient values.

20. A method according to claim 18 wherein each second difference related feature is derived by weighting first difference related features in a series derived from the series of cepstral coefficients using respective multipliers which decrease to a minimum and increase after the minimum, forming the sum of first difference related features weighted with decreasing multipliers, forming the sum of first difference related features weighted with increasing multipliers, and forming the difference between the two sums to give the second difference related features.

21. A method according to claim 17 wherein the first difference related feature is derived by calculating the difference between alternate values of a cepstral coefficient in a series of values derived from the power values in a series of the said intervals.

22. A method according to claim 17 wherein each first difference related feature is derived by weighting values of a cepstral coefficient in a series of values derived from the power values in a series of the said intervals using respective multipliers which decrease to a minimum and increase after the minimum, forming the sum of the coefficients weighted with decreasing multipliers, forming the sum of the coefficients weighted with increasing multipliers, and forming the difference between the two sums to give the first difference related feature.

23. A method according to claim 1 wherein the finite state machines are Hidden Markov Models.

24. A method according to claim 1, wherein said specific entity is a word or phrase, and said plurality of entities comprise a plurality of different words or phrases.

25. A method according to claim 1, wherein said specific entity is a language, and said plurality of entities comprise a plurality of different languages.

26. Apparatus for verifying that a sequence of operations originated from a specific entity, comprising means for storing data specifying first and second finite state machines, the data for the first machine having been derived from sets of features of the results of a sequence of operations originated by a plurality of entities, the data for the second machine having been derived from sets of features of the results of the same sequence of operations originated by a specific entity, means for extracting a test sequence of sets of features from the results of a sequence of operations which are alleged to have been originated by the said specific entity, means for matching the said test sequence against the first and second said machines, respectively, and means for comparing results from the matching means to indicate whether the test sequence was originated by the said specific entity.

27. Apparatus according to claim 26 wherein the entity is a person and the sequences of operations are the utterances of sequences of sounds.

28. Apparatus according to claim 27 wherein the finite state machines are Hidden Markov Models.

29. Apparatus according to claim 28 wherein the data specifying the Hidden Markov Models comprises a set of pairs of means (m) and variances ($\sigma^2$) for each state, the pairs of means and variances having been derived from respective distributions of values each representing a spectral component of a sound in the sequences used to derive the Hidden Markov Models.

30. Apparatus according to claim 29 wherein the means and variances are calculated from cepstral coefficients derived from the said spectral components and first and/or difference related features derived from the cepstral coefficients.

31. Apparatus according to claim 30 wherein the zero and first cepstral coefficients are omitted when deriving the means and variances.

32. Apparatus according to claim 29 wherein the means and variances are modified means and modified variances calculated using a gradient algorithm in an alpha-net comprising the two finite state machines.

33. Apparatus according to claim 32 wherein the modified mean $m_j(t)$ and the modified standard deviation $\sigma_j(t)$ are calculated from $$m_j(t) = m_j(t-1) - \xi \operatorname{sign}\left(\frac{\partial J}{\partial m_j}\right),$$

and $$\sigma_j(t) = \sigma_j(t-1) - \xi \operatorname{sign}\left(\frac{\partial J}{\partial \sigma_j}\right)$$

where $m_j(t-1)$ and $\sigma_j(t-1)$ represent the previous mean and standard deviation, $\xi$ is a constant, and J is a score value derived from the likelihood output of one of the first and second finite state machines.

34. Apparatus according to claim 32 wherein the modified mean $m_j(t)$ and the modified standard deviation $\sigma_j(t)$ are calculated from $$m_j(t) = m_j(t-1) - \xi \left( \frac{\partial J}{\partial m_j} \right),$$

and $$\sigma_j(t) = \sigma_j(t-1) - \xi \left( \frac{\partial J}{\partial \sigma_j} \right)$$

where $m_j(t-1)$ and $\sigma_j(t-1)$ represent the previous mean and standard deviation, $\xi$ is a constant, and J is a score value derived from the likelihood output of one of the first and second finite state machines.

35. Apparatus according to claim 26 wherein the entity is a person and the sequences of operations are the signing of signatures.

36. A method of verifying that operations originate from a specific entity, comprising the steps of extracting test results of the operations, matching the said test results against a first model derived from results of the same operations when originated by a plurality of entities, matching the said test results against a second model derived from results of the same operations when originated by the specific entity, and comparing the results of the matching steps to indicate whether the test results originated from the specific entity.

37. A method of identifying an utterance, which comprises:

extracting a test sequence of sets of features for said utterance;

matching said test sequence of sets of features against a first stored finite state machine model derived from sets of features corresponding to a group of utterances;

matching said test sequence of sets of features against a second stored finite state machine model derived from sets of features corresponding to said given utterance; and comparing the results of the matching steps to indicate whether said utterance corresponds to said given utterance.

38. A method according to claim 37, wherein said utterance comprises a word or phrase.

39. A method according to claim 37, wherein said utterance comprises a sample of language.

40. Apparatus for identifying an utterance, comprising means for storing data specifying first and second finite state machines, the data for the first machine having been derived from sets of features corresponding to a group of utterances, and the data for the second machine having been derived from sets of features corresponding to said given utterance;

means for extracting a test sequence of sets of features for said utterance;

means for matching said test sequence against the first and second finite state machines, respectively;

means for comparing results from said matching means to indicate whether said utterance corresponds to said given utterance.

\* \* \* \* \*